United States Patent
Hirano et al.

(10) Patent No.: US 10,085,471 B2
(45) Date of Patent: Oct. 2, 2018

(54) WHOLE EGG POWDER AND PUFFED EGG PRODUCT USING THE SAME

(71) Applicant: NISSIN FOODS HOLDINGS CO., LTD., Osaka-shi, Osaka (JP)

(72) Inventors: Yukio Hirano, Osaka (JP); Seiko Tamura, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 0 days.

(21) Appl. No.: 15/433,615

(22) Filed: Feb. 15, 2017

(65) Prior Publication Data

US 2018/0110245 A1 Apr. 26, 2018

(30) Foreign Application Priority Data

Oct. 20, 2016 (SG) .............................. 10201608832T

(51) Int. Cl.
*A23L 15/00* (2016.01)

(52) U.S. Cl.
CPC ........... *A23L 15/00* (2016.08); *A23V 2002/00* (2013.01)

(58) Field of Classification Search
CPC ............................ A23L 15/00; A23V 2002/00
See application file for complete search history.

(56) References Cited

U.S. PATENT DOCUMENTS

2010/0239712 A1* 9/2010 Brooks .................. A21D 2/165
426/61

FOREIGN PATENT DOCUMENTS

| JP | 3012052 B2 | 2/2000 |
|---|---|---|
| JP | 3252126 B2 | 1/2002 |
| JP | 2002-171897 | 6/2002 |
| JP | 2008-048615 | 3/2008 |
| JP | 2010-022363 | 2/2010 |
| JP | 2017-153470 | 9/2017 |

OTHER PUBLICATIONS

International Search Report issued in corresponding International Application No. PCT/JP2017/37434, dated Jan. 23, 2018, 6 pages with an English translation.
Imai, et al., "Regarding Dried Eggs (part 2)", New Food Industry, vol. 39, No. 2, Moritaka Uda, editor, New Food Industry, 1997, pp. 40-48, p. 40—partial translation.
Imai et al., "Regarding Dried Eggs (part 1)", New Food Industry, vol. 39, No. 1, 1997, p. 79-88, p. 80—partial translation.
Satyanayana, et al., "Studies on the spray-dried, foam-mat-dried and freeze dried whole egg powders: Changes in the Nutritive qualities on storage", Nutrition Reports International, Dec. 1987, vol. 36, No. 6, pp. 1317-1323, abstract.

* cited by examiner

*Primary Examiner* — Anthony J Weier
(74) *Attorney, Agent, or Firm* — Hamre, Schumann, Mueller & Larson, P.C.

(57) ABSTRACT

To provide a processed egg capable of making a puffed egg product which has good restorability when restored with hot water wherein said puffed egg product is characterized in that the whole egg powder has a total free amino acids content of 500 mg/100 g or more. There is also provided a whole egg powder which is suitable to be puffed, characterized in that the whole egg powder has a free methionine content of 10 mg/100 g or more. There is further provided a whole egg powder which is suitable to be puffed, characterized in that the whole egg powder has a free lysine content of 40 mg/100 g or more.

12 Claims, No Drawings

WHOLE EGG POWDER AND PUFFED EGG PRODUCT USING THE SAME

TECHNICAL FIELD

The present invention relates to a whole egg powder, and more particularly to a whole egg powder suitable for a puffed egg product with good restorability.

BACKGROUND ART

Instant noodles having various dried ingredients are on the market today. Meats, vegetables, shrimps, octopuses, puffed egg products (such as scrambled eggs) and the like have been known as the type of the ingredients.

Among those ingredients, as the puffed egg products such as instant-type scrambled eggs which become edible after restoration with hot water, freeze-dried products or hot air-dried products are used.

The freeze-dried products are produced, for example, by pouring beaten raw eggs as a raw material into a small amount of hot water to heat and coagulate them, then allowing the coagulated eggs to pass through a metal mesh or the like to make a scrambled egg-like product having a suitable grain size, and freeze-drying the resultant product directly as it is.

On the other hand, the hot air-dried products are produced, for example, by kneading powdered eggs as a raw material along with a seasoning liquid, then heating them with microwaves or steaming them, and thereafter, drying the resultant product with hot air (see, for example, Patent Document 1 and Patent Document 2).

PRIOR ART DOCUMENT

Patent Document

Patent Document 1: JP-B-3012052
Patent Document 2: JP-B-3252126

SUMMARY OF THE INVENTION

Problems to be Solved by the Invention

There is a problem that some puffed egg products such as hot air-dried scrambled eggs are poorly restored with hot water and this results in poor texture. One of the causes of such unfavorable scrambled eggs would be insufficient puffing of the eggs.

Factors which may have some influence on puffing would include a powdered egg, a puffing agent, a temperature condition, and the like. The amount of the puffing agent to be used and the temperature condition could be controlled to some degree. However, there has not been known what type of powdered eggs would have what type of influence on puffing, and there has not been known the way of identifying suitable eggs. Consequently, there has been a problem that the puffed egg products such as scrambled eggs having a stable quality are hardly obtained.

The present invention has been made in view of the above-mentioned problems. That is, it is an object of the present invention to provide a whole egg powder suitable for puffed egg products. It is also an object of the present invention to provide a puffed egg product which has good restorability when restored with hot water by using a whole egg powder suitable for puffed egg products.

Means for Solving the Problems

The present inventors have closely studied a whole egg powder and found that a puffed egg product which uses a whole egg powder having a specific physical value is excellent in puffability and restorability, to complete the present invention.

To solve the above-mentioned problems, the present invention provides a whole egg powder which is suitable to be puffed, wherein the whole egg powder has a total free amino acids content of 500 mg/100 g or more. The present invention also provides a whole egg powder which is suitable to be puffed, wherein the whole egg powder has a free methionine content of 10 mg/100 g or more. The present invention further provides a whole egg powder which is suitable to be puffed, wherein the whole egg powder has a free lysine content of 40 mg/100 g or more.

According to such characteristics, the whole egg powder having a specific value in the content of a specific amino acid contained in the whole egg powder can provide a puffed egg product having excellent puffability and restorability.

Further, to solve the above-mentioned problems, the present invention provides a puffed egg product using the whole egg powder containing a specific amount of a specific amino acid.

According to such characteristics, the whole egg powder containing a specific amount of a specific amino acid is suitable to be puffed, and thus can provide a puffed egg product which is excellent in puffability and restorability.

Effects of the Invention

According to the present invention, whether a whole egg powder is suitable to be puffed or not can be determined by investigating the amount of a specific amino acid contained in the whole egg powder. Accordingly, the present invention can reduce poor-quality wastes so that the production cost can be reduced. Further, a puffed egg product which is excellent in puffability and restorability can be produced by using the whole egg powder according to the present invention.

DESCRIPTION OF EMBODIMENTS

Embodiments for carrying out the present invention are described below with reference to scrambled eggs using the whole egg powder of the present invention.

(Whole Egg Powder)

The whole egg powder of the present invention refers to a product obtained by removing egg shells from eggs, conducting sterilization, and then conducting spray drying. Among these, the whole egg powder in the present invention is preferably desugared one. In general, liquid eggs or powdered eggs would undergo Maillard reaction or protein degradation due to the influence of heat or light thereon, whereby the protein characteristics of those eggs would be readily worsened. Many of whole egg powders are transported from abroad by land or by ship, and unexpected degradation of those powders during storage in transportation would be inevitable. Therefore, for preventing the quality loss due to Maillard reaction or the like and for securing stable quality, the whole egg powder is preferably desugared.

For example, the desugaring may be conducted after the removal of egg shells before the sterilization. The method for desugaring a whole egg powder is not specifically limited, and any suitable ordinary method can be employed.

For example, there may be mentioned a desugaring method with yeast, bacteria, enzyme or the like.

The whole egg powder used in the present invention is preferably produced by processing eggs shortly after egg-laying such as fresh eggs which are 3 day-old or less from the egg-laying. Further, the whole egg powder of the present invention is preferably stored under low temperature after the processing, for example, stored at 20° C. or less. The storing under low temperature can prevent the non-desugared whole egg powder from denaturing and decoloring.

<Measurement of Amino Acid Content>

The whole egg powder of the present invention has a predetermined value in measurement of amino acid content. Here, the "measurement of amino acid content" is conducted as follows.

(Preparation of Analysis Sample)

To 0.5 g of a whole egg powder is added 25 ml of distilled water, and the resultant is stirred for 1 hour. After the stirring, the sample is diluted up to 50 ml, and filtered through a Grade 2 qualitative filter paper. Then, 5 ml of the liquid sample after filtration and 5 ml of a 2% sulfosalicylic acid solution are taken in a centrifuge tube, and shaken on a shaker for 15 minutes. The shaken liquid sample is allowed to stand still, and then filtered through a membrane filter to make an analysis sample.

(Preparation of Standard Solution)

An amino acid standard solution is prepared by precisely weighing out 0.6 ml of commercially-available Amino Acids Mixture Standard Solution, Type H (manufactured by Wako Pure Chemical Industries, Ltd.) and 0.5 ml of a 10 mmol/L hydroxyproline solution, which are diluted with 0.02 N hydrochloric acid up to 25 ml.

(Quantification of Free Amino Acids Content)

The free amino acids content was quantified by an amino acid analyzer (JLC-500/V manufactured by JEOL Ltd.) using liquid chromatography. Here, the total free amino acids content as used in the invention of the present application refers to a total content of 17 amino acids. Specific 17 amino acids are aspartic acid, threonine, serine, glutamic acid, glycine, alanine, cystine, valine, methionine, isoleucine, leucine, tyrosine, phenylalanine, lysine, histidine, arginine, and proline.

The analysis value obtained for each amino acid was applied to the following expression, and the content (mg/100 g) of each amino acid was calculated. The free amino acids content is a sum of all of the contents of 17 respective amino acids measured.

Content of each amino acid(mg/100 g)=$A \times 10^{-6} \times B/W \times 2 \times 100$ [Expression 1]

Here, "A" means the analysis value of an amino acid of interest, and "$10^{-6}$" means the conversion factor from nmol/ml to mmol/ml. "B" means the molecular weight of the amino acid of interest. "W" means the amount (g) of sample taken, "2" is because the sample solution was mixed with sulfosalicylic acid in a 1:1 ratio, and "100" is to make the content per 100 g.

The measurement of free amino acids content can provide a simple method for identifying a whole egg powder capable of making a puffed egg product which is excellent in puffability and restorability. As a result, the poor-quality wastes can be reduced and the production cost can be reduced.

<Whole Egg Powder for Dried Scrambled Eggs/Whole Egg Powder Suitable for Puffing>

The whole egg powder of the present invention is suitable for producing dried scrambled eggs. The whole egg powder of the present invention is also suitable for puffing by a puffing agent. However, it is not known at the present time how the predetermined physical property (in particular, the amino acid content) which the whole egg powder of the present invention possesses contributes to the puffability and restorability. As one of the possibilities, it is considered that a free amino acid may react with glucose to generate a substance which inhibits the puffing of scrambled eggs. That is, it is considered that if the amount of free amino acids is large, the amount of this inhibitory substance generated is small, and the puffing of scrambled eggs will not be inhibited.

<Method for Producing Dried Scrambled Eggs>

The method for producing dried scrambled eggs using the whole egg powder having a predetermined value in measurement of amino acid content is not particularly limited, and any ordinary method can be employed.

For example, a whole egg powder, a puffing agent and starch are mixed using a mixer. Next, the mixture is kneaded while water or a seasoning liquid is added thereto. The kneading method is not particularly limited, and a mixer may be used for kneading. Preferably, the mixture is kneaded to produce small lumps having a grain size of from 1 to 30 mm, more preferably from 2 to 15 mm.

Next, the small lump eggs obtained in the kneading step are heated to be puffed and heat-coagulated. The heating method is not particularly limited, and the small lump eggs may be microwave-heated or steamed. The microwave output ratio in heating is preferably from 0.2 to 0.3 kW/kg (for 80 to 150 seconds). The steaming temperature, pressure and time are preferably from 90 to 100° C., from 0.02 to 0.05 MPa, and from about 2 to about 4 minutes, respectively.

Next, the small lump eggs thus puffed and heat-coagulated are cooled to approximately room temperature as rapidly as possible. By this cooling, the porous structure of the small lump eggs can become tougher and can be fixed as such. The cooling method is not particularly limited and may be any method capable of cooling the puffed eggs as rapidly as possible. Generally, air cooling may be employed with a fan or the like. In this case, it is preferred that the cooling be carried out in a low humidity environment so that the surfaces of the small lump eggs do not get wet. If the surfaces get wet, the restorability after drying of the eggs may worsen.

Finally, the cooled small lump eggs are dried with hot air. For the drying, a fluidized bed drier or the like is used, in which the eggs are preferably dried to have a water content of at most about 5% from the viewpoint of the storability and the shape retainability thereof.

Regarding the drying temperature and time, the eggs may be dried, for example, at a low temperature of 40° C. for a long period of time of 80 minutes, or may be dried at a high temperature of 85° C. for a short period of time of 30 minutes. In consideration of the restorability and the texture, it is preferred that the eggs be dried at a relatively low temperature of from 40 to 60° C. for 80 to 60 minutes.

The puffing agent used in the present invention may be any of those capable of generating a vapor (preferably carbon dioxide) through addition of water thereto or by heating it. The vapor such as carbon dioxide or the like generated by the agent puffs the eggs to form a porous structure therein. As a result, the eggs may be restored with hot water to be scrambled eggs having a fluffy texture.

The puffing agent includes various compounds such as sodium hydrogen carbonate (baking soda), alum, magnesium carbonate, potassium bitartrate, ammonia-based synthetic puffing agent (ammonium hydrogen carbonate, ammonium carbonate), and glucono-delta-lactone. Any other compounds which have a puffing capability and are usable as food can also be employed as the puffing agent.

The amount of the puffing agent to be added is preferably from 1 to 5 parts by weight based on 100 parts by weight of the whole egg powder. When the amount is more than 5 parts by weight, the mixture may have the taste or color peculiar to the puffing agent, which is not favorable. For example, when sodium hydrogen carbonate is used and when its amount is too large, the whole egg powder containing sodium hydrogen carbonate would have a harsh taste peculiar to the agent. On the other hand, when the amount is less than 1 part by weight, puffing would be insufficient so that the whole egg powder could not have the intended porous structure, and consequently, the restorability would be poor and the texture of the restored products would be poor.

In the present invention, if desired, a pH adjuster, starch or the like may be added. For example, a pH adjuster may prevent the whole egg powder from being alkali-burnt or from having a harsh taste when a puffing agent which exhibits alkaline after water addition is used. Starch may provide a soft texture to the whole egg powder after restoration with hot water.

EXAMPLES

The present invention is described in more detail with reference to the following Examples. The characteristics of respective Examples were evaluated according to the methods described below. The present invention is not limited to these Examples.

<Measurement of Amino Acid Content>

The amino acid content was measured as follows.

Test samples were prepared from Examples and Comparative Examples described below. With respect to the amino acid content of a mixture of a non-desugared egg yolk powder and a desugared egg white powder in Comparative Example 2, the amino acid content of the mixture was measured.

(Case of Whole Egg Powder)

To 0.5 g of each whole egg powder in Examples and Comparative Examples was added 25 ml of distilled water, and the resultant was stirred with a stirrer for 1 hour. After the stirring, the sample was diluted up to 50 ml, and filtered through a Grade 2 qualitative filter paper. Then, 5 ml of the liquid sample after filtration and 5 ml of a 2% sulfosalicylic acid solution were taken in a centrifuge tube, and shaken on a shaker for 15 minutes. The shaken liquid sample was allowed to stand still for about 5 minutes, and then filtered through a membrane filter to make a test sample.

(Case of Whole Egg Liquid)

To 1 g of a whole egg liquid was added 25 ml of distilled water, and the resultant was stirred with a stirrer for 1 hour. After the stirring, the sample was diluted up to 50 ml, and filtered through a Grade 2 qualitative filter paper. Then, 5 ml of the liquid sample after filtration and 5 ml of a 2% sulfosalicylic acid solution were taken in a centrifuge tube, and shaken on a shaker for 15 minutes. The shaken liquid sample was allowed to stand still for about 5 minutes, and then filtered through a membrane filter to make a test sample.

Next, an amino acid standard solution was prepared. The amino acid standard solution was prepared by precisely weighing out 0.6 ml of commercially-available Amino Acids Mixture Standard Solution, Type H (manufactured by Wako Pure Chemical Industries, Ltd.) and 0.5 ml of a 10 mmol/L hydroxyproline solution, which were diluted with 0.02 N hydrochloric acid up to 25 ml.

Next, the quantification of each amino acid was conducted using an amino acid analyzer (JLC-500/V manufactured by JEOL Ltd.). Then, based on the obtained data and the following expression, the content of each free amino acid and the total free amino acids content were calculated.

$$\text{Content of each amino acid(mg/100 g)} = A \times 10^{-6} \times B / W \times 2 \times 100 \quad \text{[Expression 1]}$$

(Restorability Test)

Hot water at 95° C. or higher was poured onto 10 g of the dry scrambled eggs of Examples and Comparative Examples and left for 3 minutes. After the 3 minutes, the scrambled eggs were drained, and the weight thereof was measured. The weight increase ratio in each sample was calculated.

(Organoleptic Evaluation)

The organoleptic evaluation was made as follows. Hot water at 95° C. or higher was poured onto the dry scrambled eggs of Examples and Comparative Examples and left for 3 minutes. After cooked, the resultant scrambled eggs were tasted by five panelists under blind condition to be evaluated based on the following evaluation criteria. The average score of the evaluations by the five panelists was taken as the results of the organoleptic evaluation.

<Evaluation Criteria>
5: Soft and good texture
4: Good texture
3: Relatively poorly soft but no problem in eating
2: Poorly restored and hard somewhere
1: Poorly restored and difficult to masticate.

Example 1

A powder mixture was prepared by mixing 225 g of α-waxy cornstarch, 6 g of sodium hydrogen carbonate serving as a puffing agent, and 18 g of glucono-delta-lactone with a mixer for 3 minutes.

Then, while 700 g of whole egg liquid (3 days after egg-laying) bought in a shop and a solution prepared as a seasoning liquid by adding and dissolving 40 g of sugar, 20 g of salt, 20 g of sodium glutamate and 2 g of inosinic acid/guanylic acid were added to the above powder mixture, the mixture was kneaded with a mixer at 40 rpm for 4 minutes to prepare small lump products. The mean grain size of the small lump products was 8 mm.

Then, in a household microwave oven, the small lump products were heated at 0.25 g/W for 120 seconds, and then rapidly cooled to room temperature with a cooling fan. The cooled small lump products were hot-air dried in a fluidized bed granulator at 40° C. for 80 minutes and cooled to provide scrambled eggs.

Example 2

Scrambled eggs were prepared in the same manner as Example 1, except that 250 g of a commercially-available whole egg powder (stored at low temperature after production) and 500 g of water were added to the powder mixture in place of the whole egg liquid in Example 1.

Examples 3 to 10

Scrambled eggs were prepared in the same manner as Example 2, except that 250 g of a commercially-available desugared whole egg powder was added as processed eggs to the powder mixture in place of the whole egg powder in Example 2. The whole egg powders in Examples 3 to 10 are from different lots of the same type from the same manufacturer.

Example 11

Scrambled eggs were prepared in the same manner as Example 2, except that 250 g of a commercially-available desugared whole egg powder (produced by a different manufacturer from one in Examples 3 to 10) was added as processed eggs to the powder mixture in place of the whole egg powder in Example 2.

Example 12

Scrambled eggs were prepared in the same manner as Example 3, except that the desugared whole egg powder used in Example 3 was stored at 40° C. for 2 weeks before use as processed eggs.

Comparative Example 1

Scrambled eggs were prepared in the same manner as Example 2, except that a commercially-available whole egg powder which is different (different type) from that in Example 2 was used as processed eggs.

Comparative Example 2

Scrambled eggs were prepared in the same manner as Example 2, except that a mixture prepared by mixing 185 g of a commercially-available non-desugared egg yolk powder and 65 g of a commercially-available desugared egg white powder was used as processed eggs.

Comparative Example 3

Scrambled eggs were prepared in the same manner as Example 2, except that the whole egg powder used in Example 2 was stored at 40° C. for 2 weeks before use as processed eggs.

The free amino acids content of each sample is shown in Table 1.

TABLE 1

|  | Total free amino acids content (mg/100 g) | Free methionine content (mg/100 g) | Free lysine content (mg/100 g) |
| --- | --- | --- | --- |
| Example 1 | 589.6 | 15.1 | 59.8 |
| Example 2 | 545.3 | 11.3 | 40.9 |
| Example 3 | 622.8 | 14.9 | 57.2 |
| Example 4 | 566.7 | 13.2 | 46.0 |
| Example 5 | 619.7 | 14.3 | 53.9 |
| Example 6 | 591.3 | 13.1 | 55.2 |
| Example 7 | 558.1 | 13.6 | 44.9 |
| Example 8 | 661.1 | 14.7 | 60.1 |
| Example 9 | 620.7 | 13.9 | 50.1 |
| Example 10 | 608.9 | 14.0 | 48.6 |
| Example 11 | 597.4 | 12.8 | 56.4 |
| Example 12 | 572.6 | 13.3 | 45.4 |
| Comparative Example 1 | 490.4 | 9.4 | 36.0 |
| Comparative Example 2 | 184.1 | 1.5 | 14.3 |
| Comparative Example 3 | 482.4 | 7.7 | 30.0 |

As observed from Table 1, the total free amino acids content in all of Examples 1 to 12 was 500 mg/100 g or more. In particular, the values for the total free amino acids content of the desugared whole egg powders were all high. The desugared whole egg powder (Example 8) had a value higher than that of the whole egg liquid shortly after egg-laying (Example 1). On the other hand, the non-desugared whole egg powder (Example 2) had the lowest value for the total free amino acids content in the Examples. These results suggest that, in a case where powdered eggs are used, desugared powdered eggs have a higher value for the total free amino acids content.

Next, with reference to the free methionine content and free lysine content, the free methionine content was 10 mg/100 g or more, and the free lysine content was 40 mg/100 g or more. Similar to the total free amino acids content, the desugared whole egg powder (Example 8) had a higher value than that of the whole egg liquid shortly after egg-laying (Example 1). The non-desugared whole egg powder had high values for the free methionine content and free lysine content.

On the other hand, in all of Comparative Examples 1 to 3, the total free amino acids content was less than 500 mg/100 g. In particular, the mixture of a non-desugared egg yolk powder and a desugared egg white powder had a significantly low value for the total free amino acids content. The same tendency was also seen in the free methionine content and the free lysine content.

From the above results, it was found that all of the total free amino acids content, free methionine content and free lysine content in the Comparative Examples were lower than those in the Examples.

Next, Example 2 and Comparative Examples 1 and 3 were compared. In Example 2, Comparative Example 1 and Comparative Example 3, the whole egg powders produced by the same manufacturer were stored at different storage temperatures after powdered. When Example 2 was compared with Comparative Example 1, as observed from the results in Table 1, it was found that the free amino acids content decreased depending on the storage temperature after powdered. Although not shown in Table 1, the amount of glucose was lowered in Comparative Example 1 compared to Example 2. From this fact, it is considered that some reaction between glucose and a free amino acid can take place.

Next, Example 2 and Comparative Example 3 were compared. As observed from Table 1, it was found that even in the whole egg powder stored at low temperature after powdered (Example 2), the free amino acids content was decreased by conducting the storage testing. When Comparative Example 1 was compared with Comparative Example 3, it was found that since Comparative Example 3 (40° C.) was stored under a temperature condition higher than Comparative Example 1 (normal temperature), the decrease in free amino acids content was larger. From the foregoing, it was suggested that even in a non-desugared whole egg powder, a decrease in free amino acids content can be prevented by storing the powder at low temperature after powdered. It was also confirmed that the higher the temperature to which the powder was exposed, the more the free amino acids content decreased. This is considered to be because a free amino acid and glucose hardly reacts with each other under a low temperature condition.

Next, the samples were tested for the restorability and the organoleptic evaluation. The results are shown in Table 2.

TABLE 2

| | Weight increase ratio | Organoleptic evaluation |
| --- | --- | --- |
| Example 1 | 6.0 | 5.0 |
| Example 2 | 5.0 | 3.2 |
| Example 3 | 6.0 | 5.0 |
| Example 4 | 6.0 | 5.0 |
| Example 5 | 6.0 | 5.0 |
| Example 6 | 6.0 | 5.0 |
| Example 7 | 6.0 | 5.0 |
| Example 8 | 6.0 | 5.0 |
| Example 9 | 6.0 | 5.0 |
| Example 10 | 6.0 | 5.0 |
| Example 11 | 5.5 | 5.0 |
| Example 12 | 5.8 | 4.8 |
| Comparative Example 1 | 3.2 | 1.8 |
| Comparative Example 2 | 3.5 | 1.4 |
| Comparative Example 3 | 3.2 | 1.2 |

As observed from Table 2, the dry scrambled eggs of Examples 1 to 12 all had good restorability and had a good edible texture in the organoleptic test. Specifically, the weight increase ratio in Examples 1 to 12 was 5 times or more in all cases. Of those, the weight increase ratio in Examples 1 and 3 to 10 was 6 times. On the other hand, the weight increase ratio in Example 2 was the lowest and was 5 times.

Next, referring to the Comparative Examples, the results are such that the restorability was not good in every case and the organoleptic test confirmed the poor restorability. Specifically, in Comparative Example 2 showing the best restorability among those Comparative Examples, the weight increase ratio was only 3.5 times. The lowest weight increase ratio was 3.2 times in Comparative Example 1 and Comparative Example 3.

It should be noted that those having a large weight increase ratio had a good result in the organoleptic test (in other words, those having a good result in the organoleptic test had a large weight increase ratio). In order to have a large weight increase ratio, the samples need to have good hot water absorbability, and in order to have good hot water absorbability, the samples need to be fully puffed to have a porous structure. Here, as described above, it is considered that a free amino acid reacts with glucose to generate a substance which inhibits the puffing of scrambled eggs. For this reason, it is considered that a large free amino acids content means a less substance which inhibits the puffing of scrambled eggs, and thus a fully puffed porous structure can be obtained. In fact, with reference to the results in Table 1, the scrambled eggs formed of the whole egg powder having a high total free amino acids content, free methionine content and free lysine content all had good restorability in general. On the other hand, the scrambled eggs formed of the whole egg powder having a low total free amino acids content, free methionine content and free lysine content all had poor restorability in general. From these, it can be said that the free amino acids content is effective for identifying a whole egg powder which can produce scrambled eggs with good restorability.

As described above, determination of free amino acids content provides a simple method for identifying a whole egg powder which can produce a puffed egg product which is excellent in puffability and restorability. Accordingly, the present invention can reduce poor-quality wastes so that the production cost can be reduced.

The invention claimed is:

1. A whole egg powder that is suitable to be puffed, wherein the whole egg powder has a total content of free amino acids in a range of 500 mg/100 g or more.

2. A whole egg powder that is suitable to be puffed, wherein the whole egg powder has a content of free methionine in a range of 10 mg/100 g or more.

3. A whole egg powder that is suitable to be puffed, wherein the whole egg powder has a content of free lysine in a range of 40 mg/100 g or more.

4. A puffed egg product using the whole egg powder according claim 1.

5. A puffed egg product using the whole egg powder according claim 2.

6. A puffed egg product using the whole egg powder according claim 3.

7. The whole egg powder according to claim 1, wherein the whole egg powder is produced of eggs that are three-day old or younger from being laid.

8. The whole egg powder according to claim 2, wherein the whole egg powder is produced of eggs that are three-day old or younger from being laid.

9. The whole egg powder according to claim 3, wherein the whole egg powder is produced of eggs that are three-day old or younger from being laid.

10. The whole egg powder according to claim 1, wherein the whole egg powder is stored at a temperature in a range of 20° C. or lower.

11. The whole egg powder according to claim 2, wherein the whole egg powder is stored at a temperature in a range of 20° C. or lower.

12. The whole egg powder according to claim 3, wherein the whole egg powder is stored at a temperature in a range of 20° C. or lower.

\* \* \* \* \*